(12) United States Patent
Servant et al.

(10) Patent No.: US 11,598,220 B2
(45) Date of Patent: Mar. 7, 2023

(54) DISCHARGE DOOR CONTROL RING FOR AIRCRAFT TURBOMACHINE AND TURBOMACHINE COMPRISING THE SAME

(71) Applicant: SAFRAN AIRCRAFT ENGINES, Paris (FR)

(72) Inventors: Régis Eugène Henri Servant, Moissy-Cramayel (FR); Rémi Roland Robert Mercier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 516 days.

(21) Appl. No.: 16/443,245

(22) Filed: Jun. 17, 2019

(65) Prior Publication Data

US 2019/0383160 A1    Dec. 19, 2019

(30) Foreign Application Priority Data

Jun. 19, 2018 (FR) ...................... 1855389

(51) Int. Cl.
| | |
|---|---|
| *F01D 17/16* | (2006.01) |
| *F04D 27/02* | (2006.01) |
| *F01D 17/14* | (2006.01) |
| *F01D 17/10* | (2006.01) |
| *F04D 29/56* | (2006.01) |

(52) U.S. Cl.
CPC .......... *F01D 17/162* (2013.01); *F01D 17/14* (2013.01); *F04D 27/023* (2013.01); *F04D 27/0215* (2013.01); *F04D 29/563* (2013.01); *F01D 17/105* (2013.01); *F05D 2220/32* (2013.01);

(Continued)

(58) Field of Classification Search
CPC .......... F01D 9/04; F01D 17/14; F01D 17/162; F01D 17/105; F02C 9/18; F02K 1/12–1292; F04D 27/0215; F04D 27/023
See application file for complete search history.

(56) References Cited

U.S. PATENT DOCUMENTS 2,928,234 A  *  3/1960  Brown ................. F02K 1/1207
                                                  239/455
3,685,738 A  *  8/1972  Leibach ................... F02K 1/12
                                                  239/265.39

(Continued)

FOREIGN PATENT DOCUMENTS

CA           2208801 A1    12/1998
FR           2 960 611 A1  12/2011

(Continued)

OTHER PUBLICATIONS

Search Report Under Section 17 dated Nov. 18, 2019, issued in corresponding GB Application No. 1908675.0, 2 pages.

(Continued)

*Primary Examiner* — Christopher R Legendre
(74) *Attorney, Agent, or Firm* — Christensen O'Connor Johnson Kindness PLLC

(57) ABSTRACT

A control ring for controlling discharge gates for an aircraft turbine engine extends around a casing of the turbine engine and includes a connector for connecting to the gates. The control ring includes metal sectors and composite material sectors. The metal sectors may be connected to one another by the composite material sectors and the connector may be carried by the metal sectors.

14 Claims, 2 Drawing Sheets

(52) U.S. Cl.
CPC .. *F05D 2240/126* (2013.01); *F05D 2260/606* (2013.01)

(56) References Cited

U.S. PATENT DOCUMENTS

| | | | |
|---|---|---|---|
| 5,048,286 A | | 9/1991 | Stransky et al. |
| 5,509,321 A | * | 4/1996 | Lohausen ................. F16H 1/14 |
| | | | 74/424.71 |
| 5,700,129 A | | 12/1997 | Kocian |
| 6,378,294 B1 | * | 4/2002 | Abbe ...................... F02K 1/002 |
| | | | 60/232 |
| 7,938,620 B2 | * | 5/2011 | Bouru ................... F01D 17/162 |
| | | | 415/160 |
| 2016/0169104 A1 | * | 6/2016 | Rowe ................... F04D 27/023 |
| | | | 251/129.12 |
| 2016/0319688 A1 | * | 11/2016 | Vetters ...................... F01D 5/02 |
| 2019/0383160 A1 | * | 12/2019 | Servant ............... F04D 27/0215 |

FOREIGN PATENT DOCUMENTS

| | | |
|---|---|---|
| FR | 2982904 A1 | 5/2013 |
| WO | 2007/116319 A2 | 10/2007 |

OTHER PUBLICATIONS

French Search Report and Written Opinion dated Feb. 28, 2019, issued in corresponding French Application No. 1855389, filed Jun. 19, 2018, 6 pages.

* cited by examiner

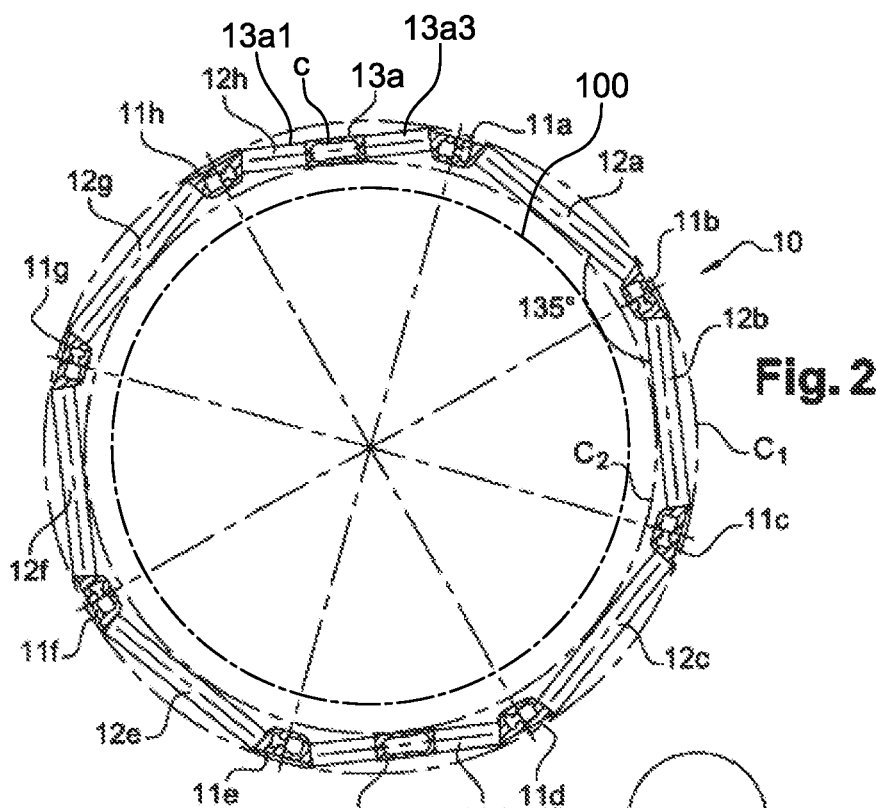
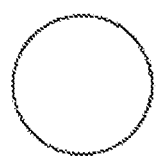
Fig. 3a
Fig. 3b
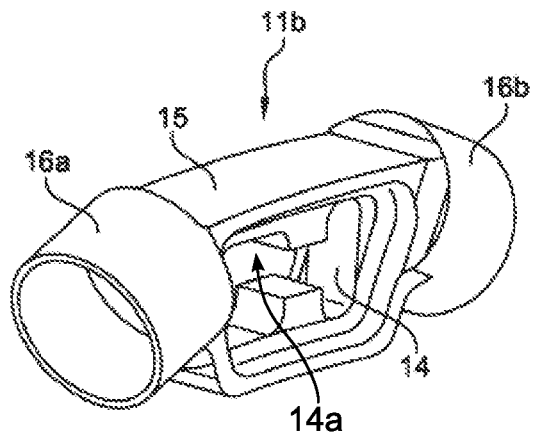
Fig. 3c
Fig. 3d
Fig. 4
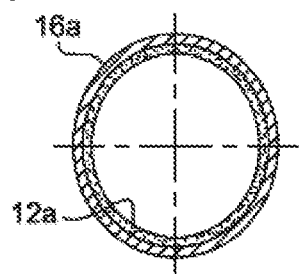
Fig. 5a
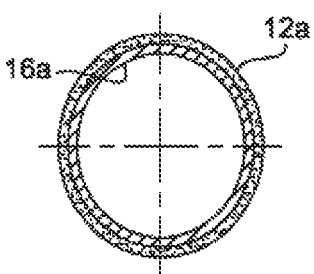
Fig. 5b

DISCHARGE DOOR CONTROL RING FOR AIRCRAFT TURBOMACHINE AND TURBOMACHINE COMPRISING THE SAME

TECHNICAL FIELD

The present disclosure relates to aircraft turbine engines. More specifically, it relates to the mechanism of discharge gates.

BACKGROUND

The state of the art comprises, in particular, documents U.S. Pat. Nos. 5,700,129, 5,048,286 and FR-A1-2 960 611.

In a turbine engine, discharge gates are generally installed in an annular row on the outer wall of the compressor stream. The opening and closing thereof are thus used to adjust an air leak rate according to the conditions of use of the turbine engine, for example, to avoid surging.

A known solution consists of using a control ring, positioned outside of the stream between the casing of the compressor and an outer cap, the rotation of which actuates lever systems driving the discharge gates. To ensure this precision, the control ring must be rigid and insensitive to high temperatures of the environment thereof. In addition, it is generally installed in a space having a limited volume, near the leading edge between the casing of the compressor and the outer cap. To respond to these limitations, such a single-piece ring is generally made of titanium, therefore heavy and expensive.

The present disclosure describes an embodiment reducing a total mass and cost of the device for controlling discharge gates, while responding to the functioning and installation limitations.

SUMMARY

The present disclosure relates to a ring for controlling discharge gates for an aircraft turbine engine. The control ring may be intended to extend around a casing of the turbine engine and include a means for connecting to the gates, wherein the control ring includes metal sectors and composite material sectors. The metal sectors may be connected to one another by the composite material sectors and the connection means being carried by the metal sectors.

The mixed structure between composite material and metal may restrict the metal sectors to the connection means, requiring a specific resistance, therefore increasing mass for the sectors connecting the sectors carrying connection means, by using a composite material.

In some embodiments, the composite material sectors each have a general tubular shape.

The tubular section may decrease the material used and offer a good resistance to traction and to compression, which corresponds to the forces to which the composite material sectors must resist.

The composite material sectors can have a circular-, oblong-, elliptic-, oval-, rectangular- or square-shaped section.

In some embodiments, the composite material sectors are connected to the metal sectors by male/female interlocking.

In some embodiments, the composite material sectors and the metal sectors can be fixed to one another by gluing or screwing.

In some embodiments, the means for connecting to the gates are constituted of a fixed portion, for example a recess, configured to engage with means for the mobile actuation of the gates, in order to drive the mobilizer by a rotational movement of the control ring.

In this manner, the control ring does not comprise any mobile portion, which simplifies the design thereof.

At least one of the metal sectors can comprise a recess, configured to be passed through by an air conduit of the engine or be connected to a device for driving the control ring in rotation.

The present disclosure also relates to an aircraft turbine engine, comprising a casing which externally defines an annular stream of a flow of a gas stream and which comprises an annular row of discharge orifices which can be blocked by gates. The turbine engine may include a ring such as described above, which extends around the casing and of which the connection means are connected to means for actuating the gates. The turbine engine may also include means for driving the control ring in rotation about a longitudinal axis of the turbine engine in view of moving the gates from the opening positions of the orifices to the closing positions of these orifices.

The turbine engine can comprise at least one air conduit extending substantially axially to the outside of the casing and passing through the recess of the at least one of the metal sectors.

In some embodiments, the means for connecting the metal sectors comprise recesses wherein devises are at least partially housed, belonging to the mobile actuation means of the gates.

BRIEF DESCRIPTION OF THE FIGURES

The present disclosure will be best understood, and other details, characteristics and advantages of the present disclosure will appear more clearly upon reading the following description, in reference to the appended drawings, in which:

FIG. 2 represents a schematic front view of a control ring according to the disclosure.

FIGS. 3A to 3D represent a transversal, cross-sectional view of different variants of composite sectors of the control ring of FIG. 2.

FIG. 4 represents a perspective view of a metal sector of the control ring of FIG. 2.

FIGS. 5A and 5B represent a transversal, cross-sectional view of methods of housing a composite sector in a metal sector.

DETAILED DESCRIPTION OF SEVERAL EMBODIMENTS

Figure 1:
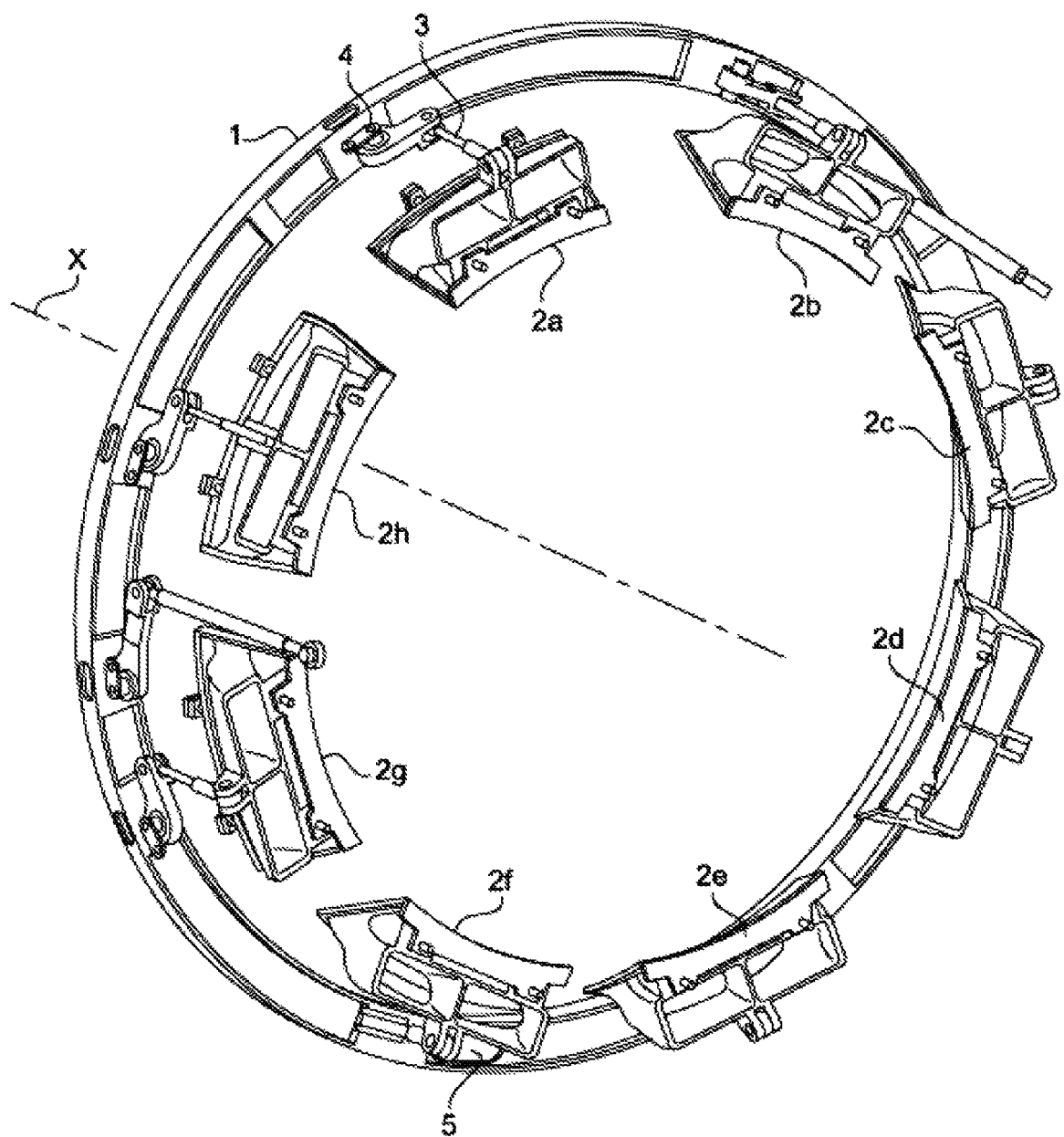
FIG. 1 represents a perspective view of a device for controlling discharge gates comprising a control ring according to the state of the art.

A control device to which the present disclosure relates is, for example, installed in an aircraft turbine engine comprising a compressor. In said turbine engine, a casing externally defines an annular stream of flow of the primary stream at the inlet of the compressor, which comprises an annular row of discharge orifices which can be blocked by discharge gates. A circular ring, centered on the axis of the annular stream and placed in the space surrounding the casing, controls the opening or the closing of the discharge gates, the controlling of which is a function of the conditions of use of the turbine engine, for example, to avoid surging of the compressor. Rotation of the control ring is carried out by actuators which are also located outside of the casing of the annular stream.

FIG. 1 displays an exemplary control device with a single-piece ring 1 according to the state of the art. The casing of the annular stream and the compressor of the turbine engine are not shown in FIG. 1 to better distinguish the elements of the control device.

In this example, a single-piece ring 1 controls eight discharge gates 2a-2h. For each discharge gate 2a, a lever actuation system 3 is fixed by a fastening 4 to the control ring 1, to transform the rotational movement of the ring 1 about the axis X of the casing 100 into an opening or closing movement of the gate 2a. The fastening 4 is arranged to form an adapted connection between the control ring 1 and the elements of the lever system 3. In this instance, this is a pivot connection about a substantially radial axis between the control ring 1 and a clevis of the lever system 3.

The presence of an aperture 5 in the lower portion of the control ring 1 will also be noted in the example. It is intended to be used as a passage to a hot air transit pipe, removed at the level of the high-pressure compressor, to the separation spout upstream of the low-pressure compressor in order to ensure the defrosting thereof. The discharge gate device 2a-2h of the example is intended to be installed between the two compressors and the available space generally involves placing the control ring 1 in the path of the hot air supply pipe.

In reference to FIG. 2, an example of a control ring 10 according to the present disclosure, adapted to the configuration of discharge gates 2a-2h described above, is composed of eight fastener-carrying sectors 11a-11h, intended to support the fasteners of the systems for actuating the eight discharge gates 2a-2h described above, connected to one another by tubular connecting sectors 12a-12h. In some embodiments, the lever actuation systems are also the same and the fasteners also ensure a pivoting connection. This system, which does not form part of the control ring itself, is not shown.

In some embodiments, as the eight discharge gates 2a-2h are identical and regularly circumferentially spaced, the eight sectors 11a-11h carrying actuation system fasteners are identical and the eight tubular sectors 12a-12h have the same dimensions. In the example, the tubular sectors 12a-12h are rectilinear. The assembly therefore forms a regular octagon.

The angle formed by two successive tubular sectors 12a, 12b, is very open, approximately 135°. The tubular sectors 12a-12h forming sides of the octagon therefore only enter slightly inside the circle C1 into which the eight fastener-carrying sectors 11a-11h fall. The space occupied by the control ring 10 therefore falls between two concentric circles C1, C2, of which the difference in diameter is slightly higher than that of a ring having a thickness of the fastener-carrying sectors 11a-11h.

In one embodiment, when the available space is very limited, an embodiment variant of the ring 10 uses curved tubular sectors, to fit into a ring having the same radial thickness as the fastener-carrying sectors 11a-11h.

Here, the tubular sectors 12a-12h uses hollow pipes made of composite material, for example, a carbon/epoxy composite. The tubes being mainly urged longitudinally under traction or under pressure, this structure is adapted and may save mass with respect to the equivalent circular sectors of a single-piece metal ring 1.

In some embodiments, as shown in FIG. 2, although the eight tubular sectors have the same dimensions, only six tubular sectors, 12a, 12b, 12c, 12e, 12f and 12g, are strictly identical. They are formed of one single tube made of composite material.

However, a first tubular sector 12h is arranged to let the hot air supply tube of the defrosting device of the separation spout mentioned above to pass through. To this end, the tubular sector 12h is divided into three tubular sectors. A central tubular sector 13a is configured to form a through orifice 13a, making it possible for the passage of the air supply pipe c. In some embodiments, this central tubular sector 13a is metal to not be weakened by the recess. It is connected to two tubular composite material sectors 13a1, 13a3 which makes the connection with the adjacent fastener-carrying sectors, 11h, 11a. However, as indicated in the FIG. 2, the central tubular sector 13a occupies a minimal space over the length of the tubular sector 12h. In this manner, the mass increase on the corresponding tubular sector 12h remains significant with respect to a fully metal sector.

In further embodiments, the second different tubular sector 12d is, for example, that on which is installed the device, not represented, for driving the control ring 10 in rotation. Here, a metal central tubular sector 13b is configured to form, without being weakened, a recess making it possible for the insertion of devises (not shown) transmitting the forces of the actuators of the device for driving the control ring 10 in rotation. As the device for driving mainly urges the tubular sector 12d in the longitudinal direction thereof, the metal central sector 13b is connected to two tubular composite material sectors which makes the connection with the adjacent fastener-carrying sectors, 11h, 11a, similarly to that of the tubular sector 12h.

In some embodiments, as shown in FIG. 3A, the transversal section of the composite tubes in the tubular sectors 12a-12h is circular. In further embodiments, it is possible to consider different section variants, as illustrated in FIGS. 3B, 3C, and 3D, where the section respectively has the shape of a rectangle with rounded edges, of an oblong element or of an oval.

In some embodiments, the shape may be based at least in part on the volume limitations and to the dynamic and mechanical efficiencies of the system.

In some embodiments, the fastener-carrying sectors 11a-11h are made of metal, advantageously titanium, to resist the forces induced by the actuation systems of the discharge gates. The use of the metal is conjugated with the gathered shape of the fastener-carrying sectors 11a-11h which returns the forces of the gate actuation forces. Each metal fastener-carrying sector 11a-11h occupies a small angular sector over the circumference of the ring 10, while the tubes made of composite material of the tubular sectors 12a-12h occupy most of the circumference of the ring 10. This may result in a significant weight gain.

As shown in FIG. 4, in some embodiments, each fastener-carrying sector, for example 11b, comprises a central portion 15 which carries a connection means 14 (e.g. a connector, connection interface, etc.) configured to assemble the fastener there, not shown, of a gate actuation system. In the example, the connection means is formed by an internal pattern in the body of the sector 11b. In this embodiment, the mobile fastener of the corresponding gate actuation system 3, which is disconnected from the control ring and which is not shown, carries a complementary pattern engaging with that of the connection means 14. This may simplify the production of the control ring 10 by avoiding including the mobile portions in it, and by fully dedicating it to the force transmission function thereof.

In the embodiment of FIG. 4, the internal pattern 14 forms a through recess 14a which gives the fastener, which can be a clevis at the end of the gate actuation system, at least one degree of freedom to slide transversally with respect to the ring.

Symmetrically along the circumferential direction around the central portion 15 of each metal sector, for example, 11*b*, two tubular nozzles 16*a*, 16*b*, are intended to receive the adjacent pipes 12*a*, 12*b* made of composite material. These pipes 12*a*, 12*b*, are inclined here by 135° one against the other to give the octagonal shape to the control ring 10.

In the example considered, the section of each nozzle 16*a*, 16*b* is circular to be adapted to a connection by a longitudinal engagement of one in the other, between the nozzle 16*a*, 16*b* and the corresponding composite tube 12*a*, 12*b*. If the section of the composite tube is rectangular with rounded or oblong or oval edges, as in FIGS. 3*b*, 3*c*, 3*d*, the section of the nozzle has a similar complementary shape.

With reference to FIG. 5, two variants are possible for forming the connection between a nozzle 16*a* of a metal sector 11*b* and the corresponding pipe 12*a*. In a first embodiment as shown in FIG. 5A, a pipe 12*a* is inserted inside the nozzle 16*a*. In the alternative embodiment, a nozzle 16*a* of the metal sector 11*b* which is inserted inside the composite pipe 12*a*. The embodiment chosen may depend at least in part on the mechanical sizing with, among things, the consideration of the thermal dilatation coefficients of the two elements.

For the fastener between the composite pipe 11*a* and the nozzle 16*a* of the metal sector 11*b*, glue may be used in a first embodiment. In this embodiment, the pipes comprise composite material with a prismatic, oblong or ovoid section have the advantage of less stress on the glue during torsions of the ring 10.

Another embodiment uses a bolted fastening, which may enable the disassembly of the control ring.

In some embodiments, in the tubular sectors 12*h* and 12*d*, the central metal sectors 13*a*, 13*b*, are connected in the same manner to the pipes made of composite material which surround them, by longitudinal engagement in one another.

In some embodiments, choosing titanium to produce the fastener-carrying sectors 11*a*-11*h*, as well as that of the sectors 13*a* and 13*b*, and of a carbon/epoxy composite material for the composite pipes of the tubular sectors 12*a*-12*h* makes it possible to limit galvanic torques.

In some embodiments, the eight fastener-carrying sectors 11*a*-11*h* are identical, to standardize the production thereof.

In an embodiment, not shown, one of the metal fastener-carrying sectors can be differentiated by adapting it to engage with the device for driving the ring. The metal structure of this sector advantageously resists the forces induced, and an intermediate metal sector specific to the rotating on a tubular sector is removed.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. An assembly comprising:
   a control ring for controlling discharge gates for an aircraft turbine engine and an actuation system, the control ring comprising:
   connectors configured for connecting to the discharge gates;
   metal sectors and composite material sectors, the metal sectors connected to one another by the composite material sectors, the connectors forming part of the metal sectors,
   wherein the connectors each have an internal pattern forming a through recess that engages with the actuation system comprising a lever so as to drive the actuation system by a rotational movement of the control ring, the actuation system being able to slide transversally within the recess with respect to the control ring.

2. The assembly according to claim 1, wherein the composite material sectors each have a tubular shape.

3. The assembly according to claim 2, wherein the composite material sectors have a shaped section selected from the group consisting of a circular, oblong, elliptic, oval, rectangular, and a square.

4. The assembly according to claim 2, wherein the composite material sectors are connected to the metal sectors by a male/female interlocking.

5. The assembly according to claim 1, where the composite material sectors and the metal sectors are fixed together by a glue or a screw.

6. The assembly according to claim 1, wherein at least one of the composite material sectors comprises an orifice positioned to be passed through by an air supply pipe of the turbine engine.

7. The assembly according to claim 1, wherein an angle formed by two successive composite material sectors is 135°.

8. The assembly according to claim 1, wherein each of the metal sectors comprises two tubular nozzles, each being fixed to the composite material sectors and a central portion arranged between the tubular nozzles, wherein the connectors are part of the central portions.

9. The assembly according to claim 1, wherein the composite material sectors are rectilinear.

10. The assembly according claim 1, wherein the composite material sectors are hollow.

11. An aircraft turbine engine, comprising:
    the assembly according to claim 1, wherein the casing externally defines an annular stream of flow of a gas stream, the casing including an annular row of discharge orifices which can be blocked by the discharge gates; and
    actuators for driving the control ring in rotation about a longitudinal axis of the turbine engine to move the discharge gates from opening positions relative to the orifices to closing positions relative to the orifices.

12. The aircraft turbine engine according to claim 11, wherein at least one of the metal sectors of the control ring comprises an orifice, wherein at least one air conduit extends axially outside of the casing and passes through the orifice.

13. The aircraft turbine engine according to claim 11, wherein the recesses of the connectors are configured for at least partially housing clevises of the actuation system.

14. An assembly for an aircraft turbine engine, the assembly comprising:
    an actuation system,
    discharge gates,
    a control ring controlling the discharge gates and comprising:
    connectors for connecting to the discharge gates,
    metal sectors and composite material sectors, the metal sectors connected to one another by the composite material sectors, the connectors forming part of the metal sectors,
    wherein the connectors each have an internal pattern forming a through recess that engages with the actuation system comprising a lever so as to drive the actuation system by a rotational movement of the control ring, the actuation system being able to slide transversally within the recess with respect to the control ring.

\* \* \* \* \*